(12) United States Patent
Ramkumar et al.

(10) Patent No.: US 7,688,775 B2
(45) Date of Patent: Mar. 30, 2010

(54) MANAGEMENT OF GUARANTEED TIMESLOT USAGE IN WIRELESS NETWORKS

(75) Inventors: Peramachanahalli Ramkumar, Bangalore (IN); Vimal Venkatesh Narayanan, Bangalore (IN); Hareesh Padmanabha Rao, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 505 days.

(21) Appl. No.: 11/540,749

(22) Filed: Sep. 29, 2006

(65) Prior Publication Data

US 2008/0080460 A1    Apr. 3, 2008

(51) Int. Cl.
*H04B 7/212*    (2006.01)
(52) U.S. Cl. ...................... 370/321; 370/442
(58) Field of Classification Search ............. 370/321
See application file for complete search history.

(56) References Cited

U.S. PATENT DOCUMENTS

| 2003/0031146 | A1* | 2/2003 | Sugaya ............... 370/336 |
| 2004/0072573 | A1* | 4/2004 | Shvodian ............ 455/450 |
| 2005/0042999 | A1* | 2/2005 | Rappaport .......... 455/307 |
| 2006/0218572 | A1* | 9/2006 | Thielman et al. ...... 725/13 |
| 2007/0022425 | A1* | 1/2007 | Jackson .............. 718/104 |

FOREIGN PATENT DOCUMENTS

KR    10-2005-0118390    * 12/2005

OTHER PUBLICATIONS

Zafer et al., Joint Scheduling of Rate-Guaranteed and Best-effort Services over a Wireless Channel, Decision and Control, 2005 and 2005 European Control Conference. CDC-ECC '05. 44th IEEE Conference on, Pub. Date: Dec. 12-15, 2005, On pp. 6022-6027.*

* cited by examiner

*Primary Examiner*—George Eng
*Assistant Examiner*—Jing (Kristen) Gao
(74) *Attorney, Agent, or Firm*—Lee & Hayes, PLLC

(57) ABSTRACT

Embodiments of guaranteed timeslot usage management in wireless networks are described.

16 Claims, 4 Drawing Sheets

MANAGEMENT OF GUARANTEED TIMESLOT USAGE IN WIRELESS NETWORKS

BACKGROUND

Wireless communication is used for an every increasing variety of devices. For example, wireless communication was typically employed by wireless phones and computers to communicate, such as over a cellular network, over a local area network, to obtain Internet access, and so on. This functionality continues to expand to include an every increasing variety of traditionally wired devices, such as computer peripherals and even devices used in health care, such as electrocardiograms, temperature monitors, and so on. However, these different devices may have different functional desires, and therefore, a variety of techniques have been developed to address this differing functionally In some instances of wireless communication, for instance, wireless media is time multiplexed for communication between network nodes in multiples of fixed time slots. The access in these time slots may be guaranteed to specific nodes or may use a suitable contention-based mechanism to arbitrate among the nodes. For example, real-time applications may utilize guaranteed time slot allocation to achieve predictable delay and avoid data loss. Since the duration of a time slot may be fixed, however, some nodes may generate blocks of data smaller than an amount of data capacity available from a single time slot, which therefore results in a portion of the single time slot from being utilized. The nature of some real-time applications (e.g., health care), for instance, could be such that the node does not wait to accumulate sufficient data to fill an entire slot before transmission, which may therefore result in inefficient usage of the guaranteed time slots.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

In the following discussion, an exemplary environment is first described that is operable to perform techniques to manage guaranteed timeslot usage of wireless devices. Exemplary procedures are then described that may be employed in the exemplary environment, as well as in other environments.

Exemplary Environment

Figure 1:
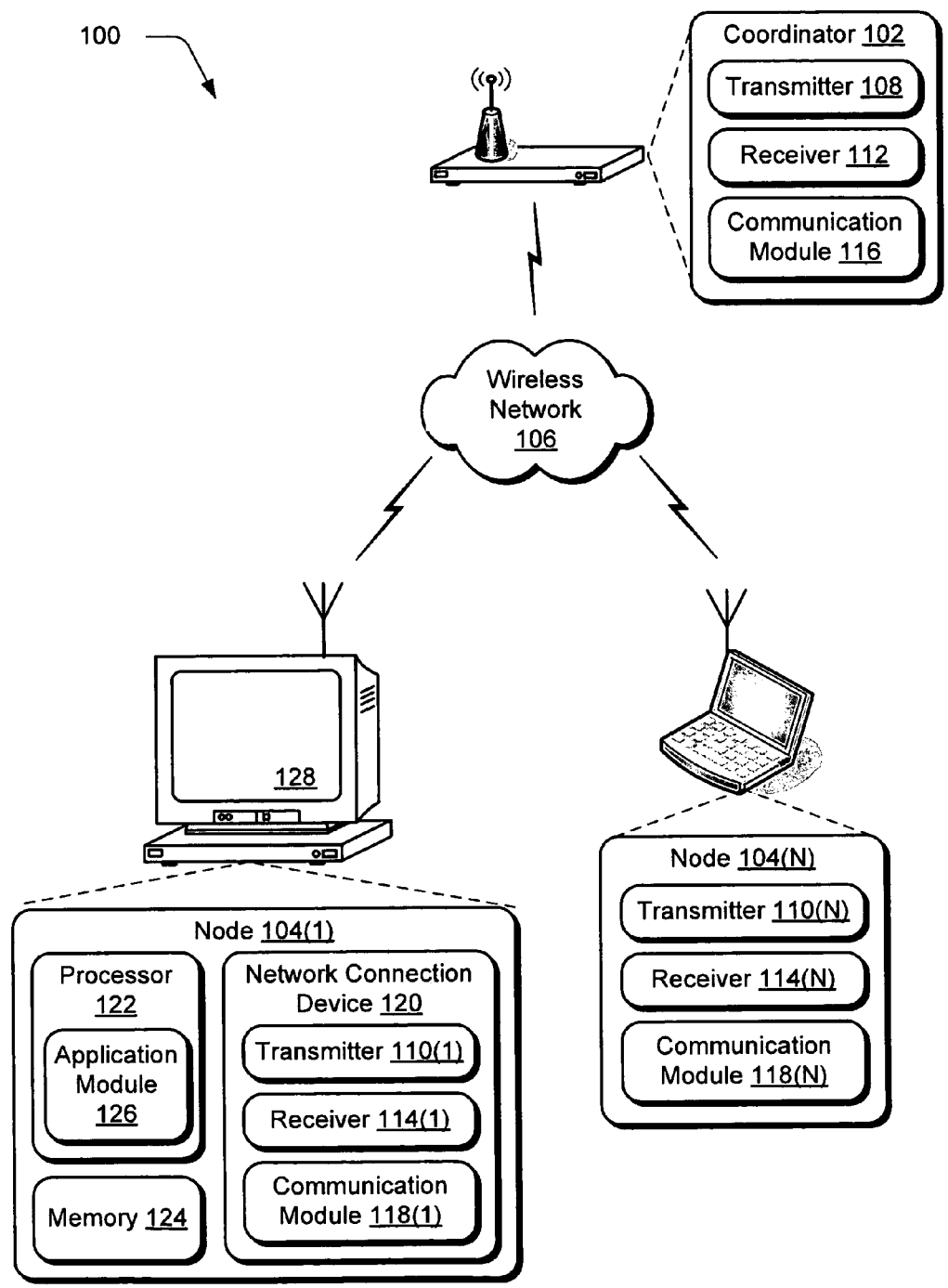
FIG. 1 is an illustration of an environment in an exemplary implementation that is operable to employ techniques to manage guaranteed timeslot usage in wireless networks.

FIG. 1 is an illustration of an environment 100 in an exemplary implementation that is operable to employ timeslot management techniques. The illustrated environment 100 includes a coordinator 102 and a plurality of nodes 104(1)-104(N) that are communicatively coupled, one to another, via a wireless network 106.

The nodes 104(1)-104(N) may be configured in a variety of ways for network 106 access. For example, one or more of the nodes 104(1)-104(N) may be configured as a computing device, such as a desktop computer as illustrated by node 104(1), a laptop computer as illustrated by node 104(N), a mobile station, an entertainment appliance, a wireless phone, sensors, and so forth. The nodes may also be configured as a wireless access, point, such as to access the Internet. Further, the coordinator 102 may also be considered a node in the wireless network 106. The nodes 104(1)-104(N) (as well as the coordinator 102), in portions of the following discussion, may also relate to a person and/or entity that operate the clients. In other words, one or more of the nodes 104(1)104(N) may describe logical nodes that include users, software, and/or devices.

For example, the coordinator 102 and the plurality of nodes 104(1)-104(N) may include respective transmitters 108, 110(1)-110(N), receivers 112, 114(1)-114(N) and communication modules 116, 118(1)-118(N) to provide network functionality, which may be accomplished in a variety of ways. The transmitter 110(1)-114(1), 118(1) of node 104(1), for instance, is illustrated as being provided by a network connection device 120. As previously described, node 104(1) is illustrated as a desktop computer, which includes a processor 122 and memory 124. Further, an application module 126 is depicted as being executed on the processor 122, which is also storable in memory 124. The application module 126 may be configured in a variety of ways, such as to communicate over the wireless network 106 through interaction with the network connection device 120 and display data pertaining to that interaction on a display device 128. A variety of other examples are also contemplated.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 124 is shown, a wide variety of types and combinations of memory may be employed, such as random access memory (RAM), hard disk memory, removable medium memory, and other types of computer-readable media.

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 124 is shown, a wide variety of types and combinations of memory may be employed, such as random access memory (RAM), hard disk memory, removable medium memory.

For example, as previously described, wireless media may be time multiplexed for communication between nodes in multiples of fixed time slots. The access in these time slots may be guaranteed to specific nodes or may use a suitable contention-based mechanism to arbitrate among the nodes. For example, real-time applications may utilize guaranteed time slot allocation to achieve predictable delay and avoid data loss. Since the duration of a time slot may be fixed, however, some nodes may generate blocks of data smaller than an amount of data capacity available from a single time slot, which therefore results in a portion of the single time slot from being utilized. For instance, the nature of some real time applications (e.g., health care) could be such that the node does not wait to accumulate sufficient data to fill an entire slot before transmission.

Accordingly, the communication module 116 of the coordinator 102 may utilize techniques that enable other nodes 104(1)-104(N) of such a network to utilize the unused capacity within such time slots for communication. For purposes of illustration, an Institute of Electrical and Electronics Engineers (IEEE) 802.15.4 (2003) wireless personal area network (WPAN) is described, which may be implemented with a mix of guaranteed time, slots and contention-based access mechanisms. It should be apparent, however, that these techniques are equally applicable to a variety of other standardized and non-standardized techniques.

For example, the coordinator 102 may be operable to form the network 106 by sending beacon packets, which contain details of the network for "new" wireless nodes (i.e., wireless nodes that are attempting to join the network), information regarding guaranteed time slots allotted for different nodes in the network 106, and so on. Nodes 104(1)-104(N), for instance, may join the network wireless network 106 using a joining protocol and may request usage of guaranteed time slots, further discussion of which may be found in relation to the following figures.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

Figure 2:
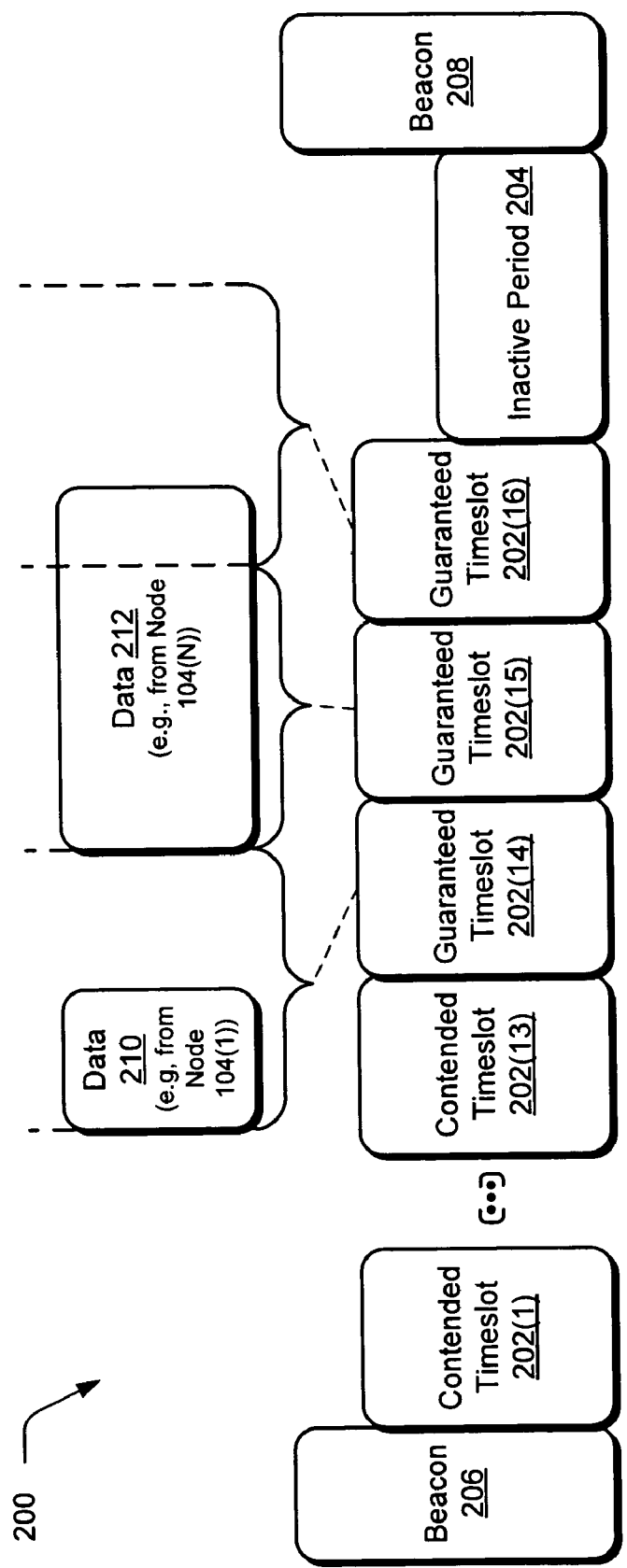
FIG. 2 is an illustration 6 of a system in an exemplary implementation showing a frame having contented and guaranteed timeslots.

FIG. 2 illustrates an exemplary implementation of a wireless frame 200 that is suitable to incorporate techniques to manage guaranteed time slots. The illustrated wireless frame 200 includes sixteen equal time slots 202(1)-202(16) (such as used in IEEE 802.15.4 as previously described). The wireless frame 200 may have a programmable number of slots for contention based access (depicted as contended timeslots 202(1)-202(13)), a number for guaranteed access (depicted as guaranteed timeslots 202(14)-202(16)) and an inactive period 204. The wireless frame 200 is bounded by beacon packets 206, 208.

The contended timeslots 202(1)-202(13) define a contention access period, in which, wireless nodes contend (e.g., via Carrier Sense Multiple Access Collision Avoidance (CSMA-CA)) for air time. Applications which have data at irregular intervals (e.g., switches), for instance, may use this period to communicate data between the wireless nodes.

The guaranteed timeslots 202(14)-202(16) define a contention free period that has dedicated time slots allocated to particular nodes for communication by coordinator of the network. Therefore, other nodes may "sleep" during these timeslots to save power. For example, the contention free period may be used by applications having data at regular intervals to communicate the data, such as health care devices (e.g., a thermometer, ECG, and so on).

An expanded illustration is also included in FIG. 2 of guaranteed timeslots 202(14), 202(15), 202(16) showing transmission of data 210, 212. With reference to FIG. 1, data 210 may originate from communication module 118(1) of node 104(1) and data 212 may originate from communication module 118(N) of Node 104(N). Using traditional techniques, if the amount of time that may be allotted for guaranteed time slots in a single beacon period is over, then another node in network 106 requesting a guaranteed time slot may resort to use of the contention period slots (202(1)-202(13)) or keep requesting allocation of a guaranteed time slot until one becomes available. As can be seen in FIG. 2, in some instances applications that are allotted guaranteed timeslots may not wait to accumulate enough data to reach full capacity of the time slot, such as due to a critical real-time nature of the application (e.g., patient monitoring data in health care), but might need a time slot for guaranteed transmission of the small amount of data generated at regular time intervals. In some implementations, guaranteed timeslots allotted by the coordinator 102 have fixed equal sizes, one to another. Therefore, using traditional techniques, if a node desires use of more time than is available in a particular guaranteed timeslot, the node requests another guaranteed timeslot.

The node allotted with guaranteed timeslot 202(14), for instance, uses half of the time slot, e.g., data 210 consumes half the available bandwidth as illustrated in comparison with the illustrated bracket. The node associated with guaranteed timeslot 202(15) uses the guaranteed timeslot 202(15) fully through transmission of data 212, but also uses a minimal amount of guaranteed timeslot 202(16), which could have been accommodated by the unused capacity of guaranteed timeslot 202(14). Thus, network utilization may be optimized if the unused time in the allocated guaranteed timeslots (e.g., guaranteed timeslots 202(14), 202(16)) of such devices may be utilized by other nodes through an appropriate arbitration mechanism.

Using traditional management techniques, for instance, the network coordinator may allocate guaranteed timeslots for different nodes, and a guaranteed timeslot may occupy more than one active frame 200. However, if a node desires bandwidth which is not an exact multiple of the fixed frame slot time, then the rest of the allocated bandwidth will go unused. Hence, techniques may be employed in which the unused portion of the allocated guaranteed timeslot is "reused" by another node.

For example, if a timeslot has a potential bandwidth of four kilobits per second (kbs), then a node requesting a guaranteed timeslot may fully utilize the allotted frame 200 timeslots if its application bandwidth is a multiple of the frame 200 timeslot bandwidth (4 kbps, 8 kbps and so on). Hence a node outputting data with a bandwidth of 6 kbps does not utilize the 2 kbps bandwidth of the guaranteed timeslot. When there are two nodes that use 6 kbps and 5 kbps of the guaranteed timeslots, respectively, then 5 kbps of bandwidth would go unused that could have been used by another device. Thus, techniques are described in which unused capacity of the guaranteed timeslots is provided for use by other nodes. For example, a subsequent node may "get into contention" (e.g., CSMA-CA) during a last partially used portion of a previous guaranteed timeslot to use the potentially wasted bandwidth.

Figure 3:
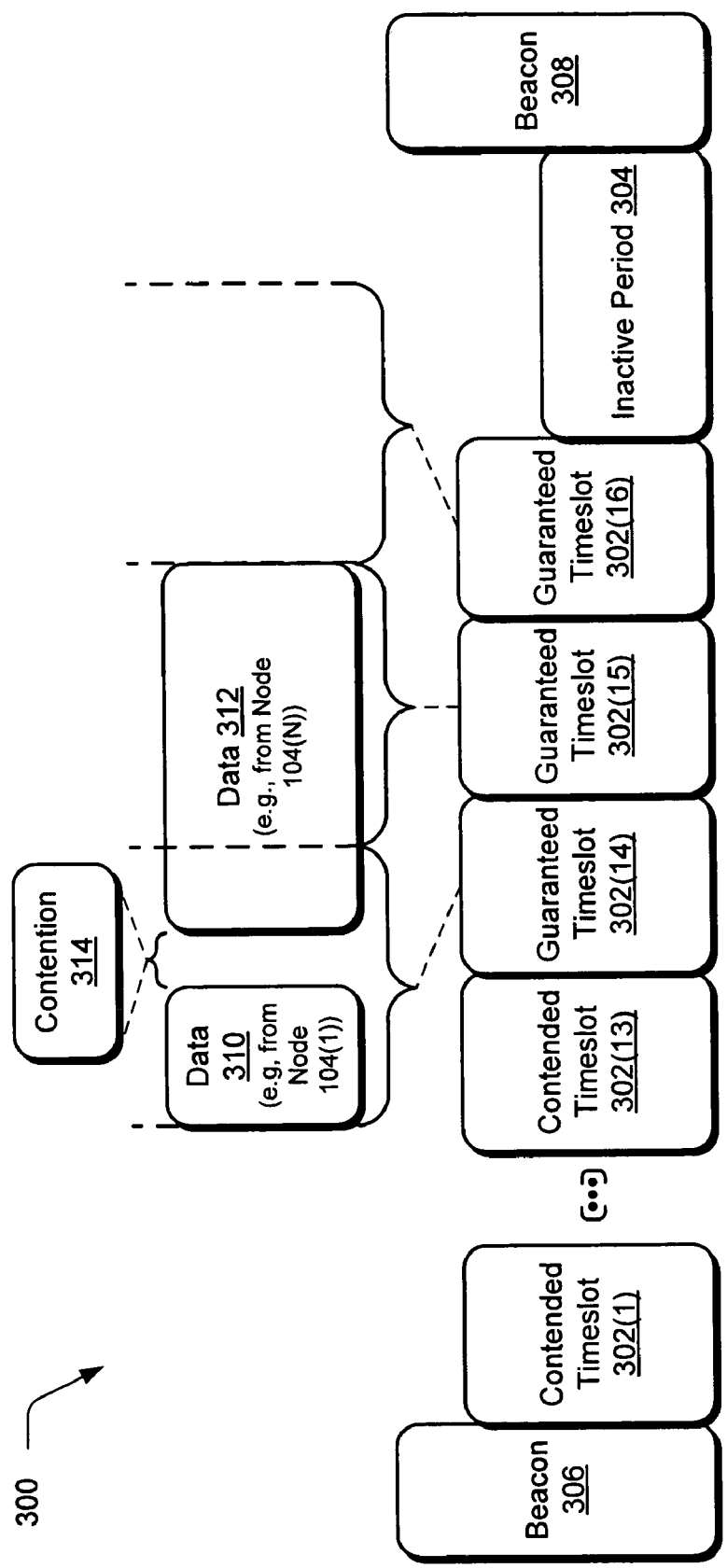
FIG. 3 is an illustration of a system in an exemplary implementation showing management of guaranteed timeslots.

FIG. 3, for instance, depicts a frame 300 in which guaranteed timeslots are managed to use unused portions. The illustrated wireless frame 300 also includes sixteen equal time slots having contended timeslots 302(1)-302(13), guaranteed timeslots 302(14)-302(16)), and an inactive period 304. The wireless frame 300 is bounded by beacon packets 306, 308.

The node allotted to guaranteed timeslot 302(14) uses the timeslot as usual to transmit data 310 and leaves the unused slot time free. The next node allotted to guaranteed timeslot 302(15), however, enters a contention 312 mode (e.g., using CSMA-CA) during the guaranteed timeslot 302(14) (i.e., one slot before allotted guaranteed timeslot) and after contention (e.g., CSMA-CA activity) takes over the remaining time in the guaranteed timeslot 302(14) to transmit data 314. Thus, the previously unused time in guaranteed timeslot covers the extra time used to transmit data 314, thus freeing up guaranteed timeslot 302(16) for another node. This free time slot can be used by an extra node desiring use of a guaranteed timeslot, can be added as contended time slot to increase contention access time for other contention based nodes, and so on.

The contention for the unused portions of the guaranteed timeslots may be performed in a variety of ways. For example, implementations that are state based may have the subsequent node in contention for the entire period of guaranteed timeslot 302(14), where the rest of the frame 300 timeslots are not tracked. In implementations in which the timeslot period is tracked, the node allotted to the subsequent guaranteed timeslot (e.g., timeslot 302(15)) may enter into contention 312 mode at the last frame 200 timeslot of the previous node and thus can conserve additional power. Even if the exact usage of the node allotted to the guaranteed timeslot 302(14) is timed, efficiency may be increased by sensing the wireless medium using contention techniques (e.g., CSMA-CA) before the second node starts transmission, thus providing a general solution to timing, overhead and robustness.

In an implementation, once the first node completes its transfer, the node switches off its radio (e.g., transmitter/receiver) freeing up the wireless medium for the second node. An un-slotted contention technique (e.g., CSMA-CA) without back-off time may be used by the second node to sense the wireless medium continuously during the last, slot of the guaranteed timeslot 302(14) period and start transmission once it senses that the wireless medium is free. Further discussion of procedures which may be used to achieve effective guaranteed time slot utilization are discussion in relation to the following exemplary procedures.

Exemplary Procedures

The following discussion describes management techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the frames 200, 300 of FIGS. 2 and 3.

Figure 4:
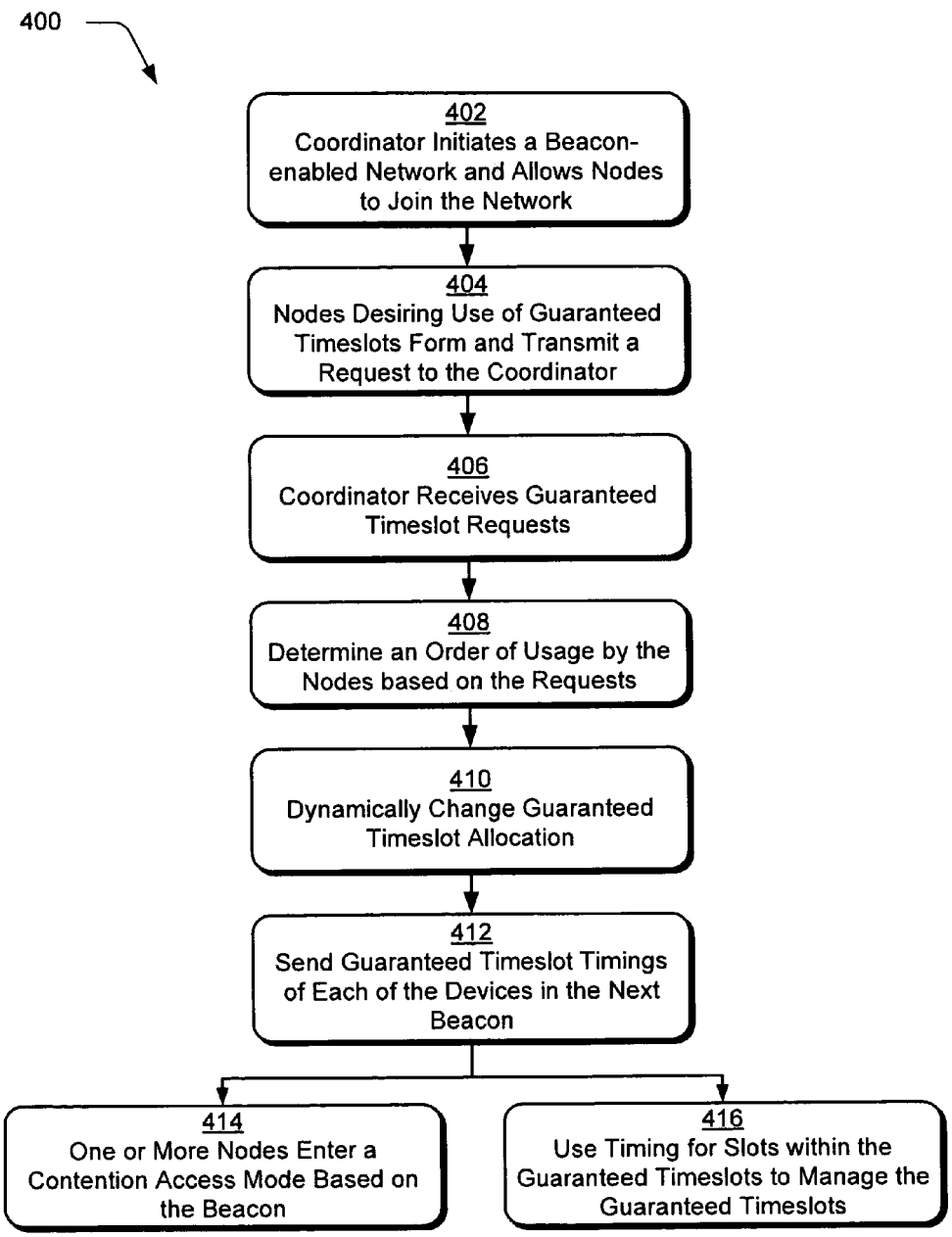
FIG. 4 is a flow diagram depicting a procedure in an exemplary implementation showing management of guaranteed timeslots in a wireless network.

FIG. 4 depicts a procedure 400 in an exemplary implementation showing management of guaranteed timeslots in a wireless network. A coordinator initiates a beacon-enabled network and allows nodes to join the network (block 402).

Nodes which desire use of guaranteed timeslots form and transmit a request to the coordinator (block 404). For example, the request may include an amount of time in the guaranteed timeslot that would go unused by the node.

The coordinator receives the guaranteed timeslot requests (block 406) and determines an order of usage by the nodes based on the requests (block 408). For example, the coordinator may base the order on an amount of unused time that would go unused in the guaranteed timeslot as requested by the nodes. A node with unused time slot of "¾", for instance, may be placed after a node having unused time slot of "½" or "¼" to take advantage of the unused time slot and recover a guaranteed time for use by another node.

Further, the coordinator may dynamically change the guaranteed timeslot allocation (block 410), such as to add allocation for "new" nodes based on new requests, remove guaranteed timeslot allocation based on a remove request, and so on. Therefore, guaranteed timeslots may be efficiently allocated for nodes desiring guaranteed timeslot to efficiently use the "free" (i.e., unused) time of one or more guaranteed timeslots.

The coordinator sends the guaranteed timeslot timings of each of the devices in the next beacon (block 412). For example, the coordinator may send a signal to each of the nodes allocated a guaranteed timeslot to indicate if the nodes are to use the unused slot time of a previous guaranteed timeslot.

Therefore, one or more nodes may enter a contention access mode based on the beacon (block 414) and perform wireless transactions as indicated by the beacon. For example, after the contention access period, the node allotted to guaranteed timeslot 302(14) may become active and start using the unused time for its transactions. When the node is done with its transaction, it may enter a sleep mode.

The node allotted to guaranteed timeslot 302(15), as described in the previous examples, may then "wake up" (i.e., leave a sleep mode), such as at a last time count of guaranteed timeslot 302(14), keep awake for the entire guaranteed timeslot 302(14) and keep sensing the air using contention access techniques (e.g., CSMA-CA) to gain access to the guaranteed timeslot 302(14), and so on. When the node using guaranteed timeslot 302(14) enters sleep mode (e.g., the node that transmitted data 310), the wireless medium becomes available and the second node may start transmission at guaranteed timeslot 302(14) itself and also continues to its allotted guaranteed timeslot 302(14). A next beacon cycle (e.g., a subsequent frame) may also follow a similar approach based on changes to the node's requirements encountered during the frame 300.

In another implementation, timing for slots within the guaranteed timeslot is used to manage the guaranteed timeslots (block 416). For example, a separate hardware timer register for slots within a guaranteed timeslots may be used. The coordinator, for instance, may initialize as many timers as the number of allocated slots within a guaranteed timeslot during the allocation of the guaranteed timeslots. Remaining timers may be initialized to zero. For example, if there are seven allocated slots within a guaranteed timeslot, then each of the timers may be initialized to a valid value.

Whenever a timer associated with a slot of a guaranteed timeslot expires, an interrupt may be generated by the hardware timer to signal to the next node that was allocated a next guaranteed timeslot to begin transmission/reception. The guaranteed timeslot timing of each slot can be maintained in different registers and expire in an ordered manner to signal expiration of slots within a guaranteed timeslot. Thus, the interrupt service routine may allow applications belonging to respective guaranteed timeslots to be scheduled and de-scheduled in the same order as the timer registers are programmed for periods of time "within" the guaranteed timeslots. Further, this scheduling may be performed by a variety of devices, such as the coordinator and/or the nodes themselves. A variety of other implementations are also contemplated.

These techniques may be configured to build upon and expand functionality available from traditional wireless communication techniques. For example, traditional techniques may be expanded to include a "guaranteed timeslot request primitive" which may include information regarding an amount of unused time that will not be consumed by a requesting node. A beacon format may also be introduced which indicates when a device is to enter contention mode during a previous guaranteed timeslot. Additionally, the coordinator may adopt a dynamic guaranteed timeslot allocation mechanism as previously described to allocate guaranteed timeslots to portions of frame timing, and even portions of a slot itself, based on on unused timeslot information to effectively use bandwidth of guaranteed timeslots.

For example, characteristics of a traditional guaranteed timeslot request primitive may be changed to use a reserved field to mention what portion (e.g., percentage) of the guaranteed timeslot may be re-used by a next. Thus, use of the reserved field may conserve overhead. The field, in some instances, is two bits in length and thus scales from zero to three, which may indicate respective amounts of time, an example of which is depicted as follows:

| | |
|---|---|
| 0 | No re-use |
| 1 | ½ of the slot can be reused |
| 2 | ¾ of the slot can be reused |
| 3 | ¼ of the slot can be reused |

This provides granularity to the coordinator to allocate guaranteed timeslots (and slots within the guaranteed timeslots) as to which devices are to be placed in order to reuse the bandwidth effectively. It should be appreciated that the number of bits allotted for this may be increased to improve the granularity of the frame if desired.

The guaranteed timeslot list field of the beacon may also be changed to bear a bit indicating whether a node is to reuse the last slot of the previous guaranteed timeslot. Thus a node with allotted guaranteed timeslot need not be awake in previous guaranteed timeslot since the last guaranteed timeslot is fully utilized. The coordinator, for instance, may dynamically allocate guaranteed timeslots (and slots within the timeslots) based on new requests and hence child devices may track beacons regularly to know if their guaranteed timeslot has changed slots. A new guaranteed timeslot request can potentially change the slot allocation of previous guaranteed timeslot based on the bandwidth requested.

With the above mentioned changes on the primitives, child nodes of a coordinator may understand if they are to open their transceivers and enter a contention mode (e.g., CSMA-CA) in the frame slot time in the contention free period before the start of their designated guaranteed timeslot. When the first node stops transmission, the next node (e.g., using CSMA-CA) may sense the medium to be free for use and therefore transmit as desired. In the case where the coordinator transmits data, for example, the coordinator knows when the first node is done with communication and starts communicating with the second node. Since the second node has its transceivers on, it can capture the data. Thus by implementing the above methodology, portions of guaranteed timeslot that were going unused can be used by other devices in order and thus effectively "create" or "re-use" additional time, which may be used to form additional timeslots, such as to form new guaranteed timeslots, and so on.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus comprising: a receiver; and a module to: use the receiver to receive a first request from a first node and a second request from a second node to use a guaranteed timeslot in a wireless frame, wherein the first request and the second request each includes an indication of an amount of time in the guaranteed timeslot that is not to be used by a respective said node, wherein the indication of the amount of time comprises a fractional representation of a ratio of the amount of time of the guaranteed time slot that is not to be used versus a total time allocated to the guaranteed timeslot; and allocate usage of the guaranteed timeslots based on the requests, wherein the usage is allocated such that at the first node and the second node are each allocated at least a portion of a single said guaranteed timeslot and the usage is allocated by determining an order of usage by the first node and the second node of the guaranteed timeslot based on the indication of the amount of time, wherein the order of usage is prioritized to fully utilize an entire guaranteed timeslot by matching the indication of the amount of time.

2. An apparatus as described in claim 1, further comprising sending a beacon having the allocated usage to one or more said nodes.

3. An apparatus as described in claim 1, wherein the receiver and the module are included in node that also requests usage of at least one said guaranteed timeslot.

4. An apparatus as described in claim 1, wherein the receiver and the module are included in node configured as a coordinator that does not request usage of at least one said guaranteed timeslot.

5. An apparatus as described in claim 1, wherein the wireless frame also includes a contention access period having one or more contended timeslots to be used by the nodes.

6. An apparatus as described in claim 1, wherein the module is to perform the allocation dynamically to change a previous said guaranteed timeslot allocation.

7. An apparatus as described in claim 6, wherein the dynamic allocation is performed in response to one or more requests received during a previous said wireless frame.

8. An apparatus as described in claim 1, wherein the module is to use one or more timers to differentiate slots within the guaranteed timeslots to manage use of the guaranteed timeslots by the nodes.

9. An apparatus as described in claim 1, wherein the receiver and the module are included in node configured in accordance with one or more Institute of Electrical and Electronics Engineers (IEEE) 802.15.4 (2003) wireless personal area network (WPAN) standards.

10. An apparatus comprising: a receiver; and a module to: form a request to use one or more of a plurality of guaranteed timeslots in a wireless frame, wherein the request indicates an amount of time that is not to be used in the one or more said guaranteed timeslots, wherein the request comprises a reserved field that indicates what percentage of a guaranteed timeslot will not be utilized, wherein the percentage represents a ratio of the amount of time of the guaranteed time slot that is not to be used versus a total time allocated to the guaranteed timeslot; and based on a response to the request, use the receiver to enter a contention mode during at least one said timeslot to determine whether a slot within the at least one said timeslot is available, wherein the usage is allocated such that at a first node and a second node are each allocated at least a portion of a single said guaranteed timeslot and the usage is allocated by determining an order of usage by the first node and the second node of the guaranteed timeslot based on the indication of the amount of time, wherein the order of usage is prioritized to fully utilize an entire guaranteed timeslot by matching the indication of the amount of time.

11. An apparatus as described in claim 10, wherein:
the at least one said timeslot is available because a previous node that was allocated usage of the at least one said timeslot did not use each slot within the at least one said timeslot.

12. An apparatus as described in claim 10, wherein the contention mode employs one or more Carrier Sense Multiple Access Collision Avoidance (CSMA-CA) techniques.

13. An apparatus as described in claim 10, wherein the wireless frame also includes a contention access period having one or more contended timeslots.

14. One or more computer-readable media comprising executable instructions that, when executed, direct a node to: form a request to use one or more of a plurality of guaranteed timeslots in a wireless frame, wherein the request indicates an amount of time that is not to be used in the one or more said guaranteed timeslots, wherein the indication of the amount of time comprises a fractional representation of a ratio of the amount of time of the guaranteed time slot that is not to be used versus a total time allocated to the guaranteed timeslot; receive a response indicating one or more particular said guaranteed timeslots allocated to the node, wherein the usage is allocated such that at a first node and a second node are each allocated at least a portion of a single said guaranteed timeslot and the usage is allocated by determining an order of usage by the first node and the second node of the guaranteed timeslot based on the indication of the amount of time, wherein the order of usage is prioritized to fully utilize an entire guaranteed timeslot by matching the indication of the amount of time; and enter a sleep mode during at least one said guaranteed timeslot.

15. One or more computer-readable media as described in claim 14, wherein the executable instructions direct the node to enter a contention mode during a specific said timeslot to determine whether a slot within the specific said timeslot is available.

16. One or more computer-readable media as described in claim 14, wherein at least one of the one or more particular said guaranteed timeslots allocated to the node is to be shared by another node.

* * * * *